United States Patent
Kahn et al.

[15] 3,662,544
[45] May 16, 1972

[54] COMBINED AUXILIARY POWER AND ENGINE STARTER SYSTEMS

[72] Inventors: Peter Burno Kahn; Norman Frederick North, both of Fareham, England

[73] Assignee: The Plessey Company Limited, Essex, England

[22] Filed: May 15, 1970

[21] Appl. No.: 37,687

[30] Foreign Application Priority Data

May 19, 1969 Great Britain.....................25,490/69

[52] U.S. Cl. ............................................60/39.14, 60/39.15
[51] Int. Cl. .........................................................F02c 7/26
[58] Field of Search ............60/39.14, 39.15, 39.16, 39.28 P; 416/25, 27, 28, 29, 30; 115/34, 37

[56] References Cited

UNITED STATES PATENTS 3,145,532   8/1964   Moss.....................................60/39.14

FOREIGN PATENTS OR APPLICATIONS 730,392     3/1966   Canada................................60/39.14
1,292,122   3/1962   France.................................60/39.14
1,025,782   4/1966   Great Britain......................60/39.14

*Primary Examiner*—Clarence R. Gordon
*Attorney*—Scrivener, Parker, Scrivener and Clarke

[57] ABSTRACT

To permit an auxiliary power unit to start an engine without drastic temporary reduction of the running speed of that unit, the engine is coupled to the auxiliary power unit by a differential gear drive whose third element drives a gear pump having in that outlet which is the delivery outlet when the auxiliary power unit drives the engine, a normally unloaded pressure retaining valve which, to produce starting torque for the engine, can be loaded to build-up a preset delivery pressure. A pre-loaded pressure-retaining valve may be provided in the other pump outlet in order to permit transmission of torque from the main engine to the auxiliary power unit, both valves being by-passed in the respectively reverse direction by non-return valves.

4 Claims, 5 Drawing Figures

COMBINED AUXILIARY POWER AND ENGINE STARTER SYSTEMS

This invention relates to auxiliary-power systems of the kind constructed to permit their prime mover to be utilized when required to start an engine, for example a main turbojet engine of an aircraft, and has for an object to provide an improved auxiliary power unit of the kind specified which enables the starting of the engine to be effected without involving a drastic temporary reduction of the running speed of the auxiliary-power unit. The avoidance of such drastic loss of speed is important when the auxiliary power unit is already running, for example, for generating electricity.

According to the present invention this object is achieved by interposing, in the drive from an output shaft of an auxiliary power unit to each engine to be started by the auxiliary power unit, a differential gear drive of which two elements are respectively coupled to the auxiliary power unit and to the engine while the third element is coupled to a positive-displacement pump which is arranged to deliver when forward driving torque is transmitted to the engine, fluid, preferably liquid, to a low-pressure point, for example by returning it to the pump inlet, through a pressure retaining valve whose loading is normally kept very low so as to allow substantially unimpeded flow of the delivered liquid, thus causing the pump to allow the said third element to rotate with very little resistance, this valve having loading means, preferably an adjustable spring, for pre-loading the pressure-retaining valve with a force which is so determined that the torque opposed to the rotation of the third element due to the pressure drop in the retaining valve will, via said differential-gear drive, apply to the engine a torque sufficient to start the engine but insufficient to reduce the speed of the auxiliary power unit beyond a given limit.

In many cases it is desirable to provide in addition a facility for the engine to transmit, when it is running normally, driving power to the auxiliary power unit thus, for example, taking-over the drive of an electric generator or other aircraft auxiliary equipment previously driven by the prime mover of the auxiliary power unit. According to a further development of the invention this can be achieved by providing, in a line connecting the point of low pressure with the other side of the pump, a second pressure-retaining valve, operable by flow in the opposite direction and preferably permanently pre-loaded to open at a pressure corresponding to the maximum torque intended to be transmitted from the starting-power output shaft to the auxiliary power unit so as to oppose the appropriate torque resistance to rotation of the third element of the differential gear drive in the opposite direction when the said output shaft tends to run faster than the speed at which it tends to be driven by the auxiliary power unit via the differential gear drive, back-flow-operated non-return valves being provided which respectively by-pass the two pressure retaining valves to permit unrestricted flow past each pressure-retaining valve in the direction opposite to that in which the retaining valve will operate, so that during the starting of an engine the by-pass valve of the last-mentioned pressure-retaining valve, and during drive from the engine to the auxiliary-power unit the non-return valve by-passing the first-mentioned pressure-retaining valve is open.

In order that the invention may be more readily understood, an embodiment as employed in conjunction with two combustion engines, represented as the port and starboard engines of an aircraft, will now be described in more detail with reference to the accompanying drawing, in which:

FIG. 5 is a diagrammatic axial section of a solenoid valve and a two-way valve.

Figure 1:
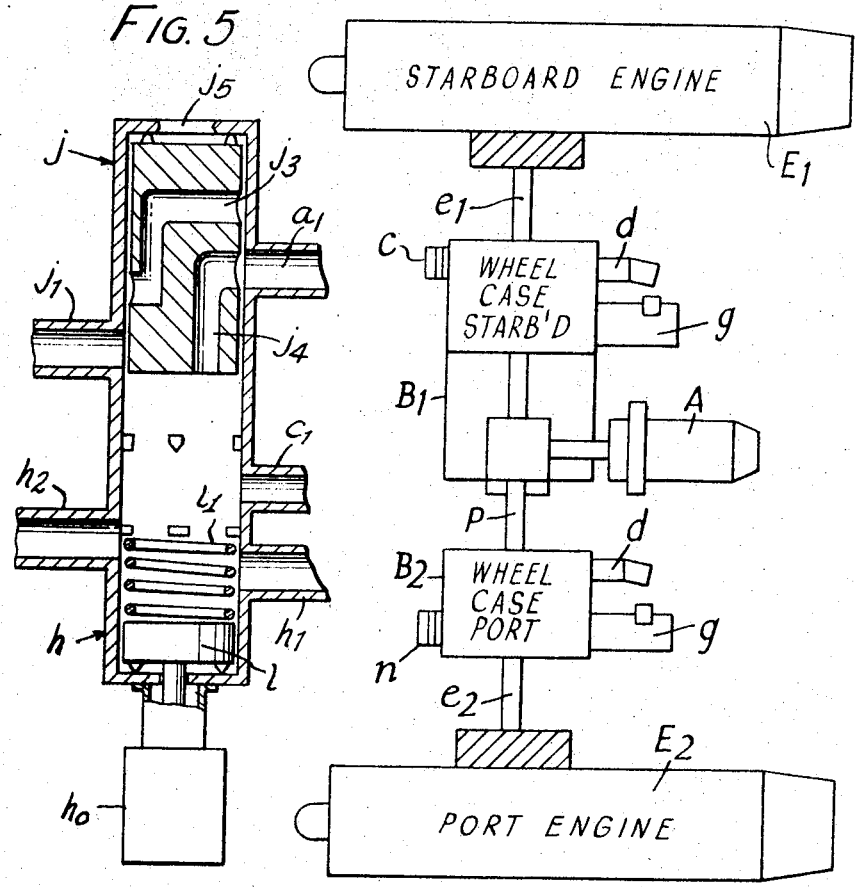
FIG. 1 is a somewhat diagrammatic plan view of the system.

Referring now first to FIG. 1, the port and starboard engines of an aircraft are respectively illustrated at $E_1$ and $E_2$, while A is an auxiliary power unit, for example a gas-turbine unit equipped with the necessary facilities for starting it. This auxiliary power unit A is intended, during normal flight of the aircraft, to drive, and/or control the speed of aircraft auxiliary systems and is also intended for use to start the engines in such a manner that starting of an engine may be effected while the auxiliaries are driven and without unduly reducing the speed of the auxiliaries as controlled by speed control means forming part of the auxiliary-power unit A. Two auxiliaries systems are shown, each represented by a generator $g$ and a hydraulic pump $d$, and each associated with one of the engines $E_1$ and $E_2$, and the means for distributing the power from the power unit A are accommodated in two wheel cases $B_1$ and $B_2$ respectively connected by starting-power output shafts $e_1$ and $e_2$ to the starboard engine $E_1$ and the port engine $E_2$. The starboard wheel case $B_1$ is also equipped with means for attachment of the auxiliary-power unit A and with means for transmitting driving auxiliary power between this power unit A and the port wheel case $B_2$ when required.

Figure 2:
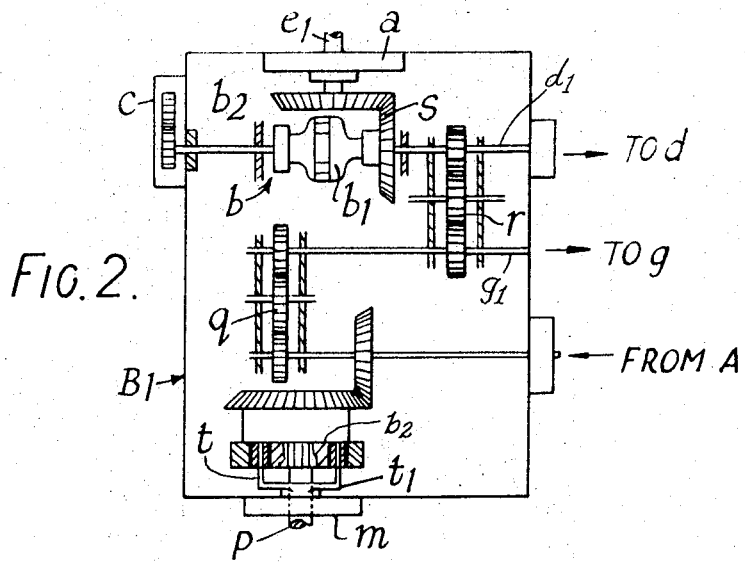
FIG. 2 is a more detailed plan view of the starboard wheel-case unit employed in this system in conjunction with the starboard engine.

Referring now to FIG. 2, which illustrates the starboard wheel case $B_1$ but may, with such omissions and modifications as will hereinafter become apparent, be also considered as representative of the port wheel case $B_2$, each wheel case carries, by suitable so-called pads, a hydraulic pump $d$ and an electric generator $g$, both of which are required to be driven at a reasonably constant speed, and the starboard wheel case $B_1$ has an additional pad for attachment to the auxiliary-power unit A. This auxiliary power unit may be, for example, a gas-turbine unit of the kind obtainable from The Plessey Company Limited under the registered Trademark Solent. In such a gas-turbine unit output is obtained from a power turbine which is driven by gases from a combustion chamber supplied with air by a gas generator having its own turbine wheel, the arrangement being such that the speed of the power turbine can vary independently of the speed of the gas generator turbine, and the turbine unit is equipped with suitable starter means associated with the gas generator turbine.

The starboard starting-power output shaft $e_1$ extends from the starboard wheel case $B_1$ to the starboard engine $E_1$, and in order to permit a pre-flight check-out of the hydraulic and electric systems employing the pump $d$ and generator $g$ mounted on the starboard wheel case $B_1$, means are provided which permit the shaft $e_1$, and thus the starboard engine $E_1$, to be disconnected from the auxiliary-power unit A. Similarly means are provided for disconnecting the auxiliary-power unit A from the wheel-case connection shaft $p$ leading to the port wheel case $B_2$, thus disconnecting the latter from the starboard wheel case $B_1$ in a manner which will become apparent further below.

Figure 3:
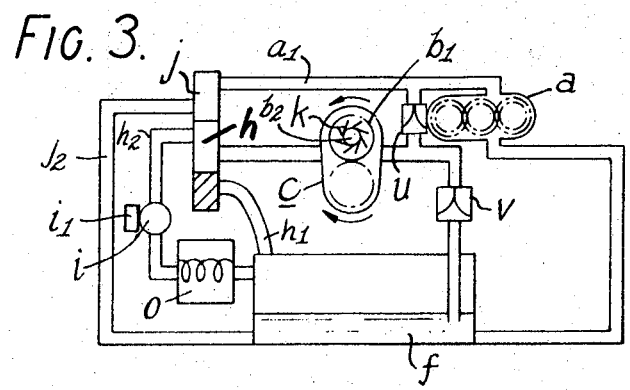
FIGS. 3 and 4 are somewhat diagrammatic elevational illustrations of the hydraulic circuits which respectively include the two gear pumps that are shown in FIG. 2 as associated with one each of the two differential gear drives.

Thus, while the shaft $g_1$ leading to the generator $g$ is permanently coupled to the output shaft of the auxiliary power unit A by a fixed-ratio gear drive $q$ and the shaft $d_1$ leading to the hydraulic pump $d$ is permanently coupled to the generator shaft $g_1$ by a second fixed-ratio gear drive $r$, the connection from the generator shaft $g_1$ to the starting-power output shaft $e$ which leads to the starboard engine $E_1$, includes a planetary-type differential gear drive $b$ of which one element is connected to the shaft $d_1$, and to a sun wheel of which the starting-power output shaft $e_1$ is connected through the housing of the differential, while its planet-carrier unit $b_2$ is connected to a gear pump $c$ for hydraulic co-operation with the three-gear motor $a$. The starting power output shaft $e_1$, which by bevel gears $s$ is connected to the third element of the differential gear drive $b$, is further connected to a three-gear hydraulic motor indicated at $a$. The hydraulic circuit including the gear pump $c$ and the three-gear motor $a$ is illustrated in FIG. 3 and additionally includes a solenoid operated change-over valve $h$. When the solenoid is de-energized, the valve allows the gear pump $c$ to draw oil from a sump $f$ via a non-return valve $v$ and return it, with very little resistance, through the valve $h$ and a spill line $h_1$ to the sump $f$ so that virtually no torque reaction is transmitted by the pump $c$ to the planet carrier $b_2$ of the differential $b$, and therefore virtually no torque is transmitted by the differential $b$ to the starting-power output shaft $e_1$. The manner of operation of the change-over valve $h$ will be more readily understood by reference to FIG. 5, which shows the valve as having a piston $L$ for the control of the spill line $h_1$. When the solenoid $h_0$ is de-energized, this piston is held in its illustrated position, clear of the inlet to spill line $h_1$, by a spring $l_1$, thus permitting oil coming through line $c_1$ from pump $c$ to be spilt to the sump $f$ via the spill line $h_1$. No flow will take place through the line $h_2$ because with spill line $h_1$ open, no pressure will be produced sufficient to overcome the resistance of the temperature-controlled pressure retaining valve $i$.

Assuming that the auxiliary power unit A is already running and driving the hydraulic pump $d$ and generator $g$ of the starboard wheel case $B_1$ for checkout purposes, and it is now intended to start the starboard engine $E_1$, the solenoid of the change-over valve $h$ in wheel case $B_1$ is energized and as a result the valve $h$ will divert the oil flow delivered by pump $c$ from the spill line $h$ to a line $h_2$ which, while also eventually leading to the sump $f$, contains a pressure-retaining valve $i$ whose pressure loading is so controlled, by an element $i_1$ sensitive to ambient temperature, as to establish a relatively high back pressure at low ambient temperatures, i.e. when a high starting torque is required, and to progressively reduce this pressure with rising ambient temperature. The pressure thus established by the pressure-retaining valve $i$ produces a flow via a pressure-controlled two-way valve $j$ to the three-gear hydraulic motor $a$, thus causing this motor to apply a torque to the starting-power output shaft $e_1$ for the starboard engine $E_1$. When the solenoid $h_0$ is energized, it moves the valve piston $l$ to block the inlet to passage $h_1$ so that the flow from pump $c$ arriving by line $c_1$ can return to sump $f$ only be overcoming the resistance of valve $i$ in line $h_2$ and will otherwise have to pass through the motor $a$ via the line $a1$.

The operation of the pressure-controlled two-way valve $j$ will also be clear by referring to FIG. 5, which shows the valve having a piston $j$ which is freely movable under the action of the difference between the pressure in line $c_1$ and the ambient pressure acting on the opposite side of the piston $j'$ through an aperture $j_5$. This valve piston $j$ controls communication between a sump line $j_1$ and a connection line $a_1$ to the motor $a$ with the help of two port passages $j_3$ and $j_4$ provided in the piston $j'$. In the illustrated position, this piston $j'$ blocks the sump line $j_1$ and admits liquid from the pump line $c_1$ to the motor line $a_1$ and thus to the three-gear motor $a$ to assist in the starting of the engine.

When, after the engine has become self-sustaining, delivery from pump $c$ becomes insufficient to feed the three-gear motor $a$, the pressure in line $a_1$ and the space between the pistons $l$ and $j'$ of valves $h$ and $j$ respectively will drop sufficiently to allow the ambient pressure acting through the aperture $j_5$ to move the piston $j'$ of valve $j$ downwardly to a position in which it blocks the connection between the motor line $a_1$ and the space between the two pistons $j'$ and $l$ while the port passage $j_3$ establishes an alternative connection between the motor line $a_1$ and the sump line $j_1$, thus allowing the three-gear motor $a$, which now works as a pump, to aspire oil from the sump via the line $j_1$. As a result of the reaction produced by the pressure against which the pump $c$ has now to work, the differential gear drive $b$ will now transmit torque to the starting-power output shaft $e_1$, which is additional to the torque applied to this shaft by the three-gear $a$, a, and as this application of torque increases the speed of the engine $E_1$ and of the starting-power output shaft $e_1$ while the speed of the auxiliary power unit A remains constant, the speed at which the pump $c$ is driven by the differential gear drive $b$ decreases progressively so that the rate of flow delivered to the three-gear motor $a$ correspondingly drops, and when the engine is virtually self-sustaining, the volumetric output of the pump $c$ becomes inadequate to supply the flow required to drive the hydraulic motor $a$ at the speed of the shaft $e_1$. The three-gear motor $a$ therefore now operates as a pump, its intake flow being supplemented by flow from the sump $f$ via a non-return valve $u$. The resulting variation in pressure causes the pressure-sensitive two-way valve $j$ to shut-off the flow from the pump $c$ via the valve $h$ to the three-gear motor $a$, so that this motor no longer supplies torque, and the torque available at the starting-power output shaft $e_1$ is thus reduced to that transmitted by the differential-gear drive $b$. A sprag clutch $k$ is further provided which locks this differential gear drive when the speed of engine $E_1$ rises to a value at which the torque reaction on the planet carrier $b_2$ of the differential-gear drive $b$ becomes reversed, and the engine $E_1$ will then supply power to the differential-gear housing $b_1$ thus removing the load from the auxiliary power unit A. The latter will therefore now run under idling conditions until it is shut off by the crew. Since under these conditions the differential-gear drive $b$ is locked, the differential gear drive $b$ is in operation only during the starting of the engine $E_1$ so that it is sufficient for the differential gear drive $b$ to be laid out only for the starting torque required.

The port engine $E_2$ is connected by a shaft $e_2$ to a port wheel case $B_2$, which may be generally similar to the gear case $B_1$ except for the portion of the latter that carries the auxiliary-power unit A, for the absence of a three-gear motor on the shaft $e_2$ port starting-power output shaft, and for the modification of the circuit connected to its pump $m$.

Figure 4:
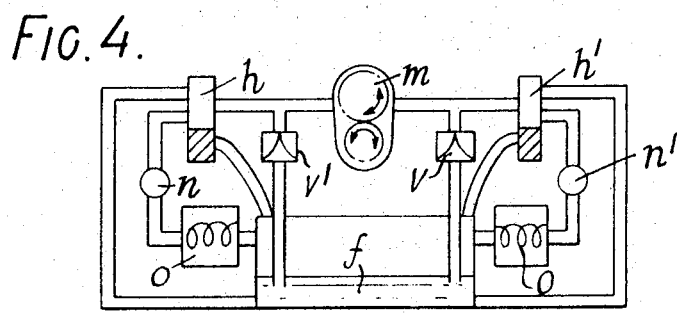

In FIG. 2 it has, however, been assumed that the connection between the auxiliary-power unit A and the port starting power output shaft $e_2$ connected to the port engine $E_2$ is effected by a second differential gear drive $t$, which is interposed between the auxiliary power unit A and the wheel-case connection shaft $p$ leading to the port wheel case $B_2$. As shown in FIG. 2, the wheel-case connection shaft $p$ is connected to the sun gear $t_2$, and the auxiliary power unit A is connected to the annulus gear, of the second differential-gear drive $t$, while the planet carrier $t$ of that differential-gear drive is connected to a gear pump $m$ whose circuit is illustrated in FIG. 4. Starting of the port engine $E_2$ is intended to be normally effected after the starboard engine $E_1$ has been started and is available for supplying power, so that plenty of power is now available. For this reason the three-gear hydraulic motor $a$ of starboard wheel case $B_1$ has been omitted, and the starting-torque output transmitted to wheel-case connection shaft $p$ is obtained, when solenoid valve $h$ of the port wheel case $B_2$ is energized, by means of a simple relief valve $n$, set at a relatively high pressure, in the line leading from the outlet of the gear pump $m$ to the wheel-case sump $f$. Similarly to the case of the starboard wheel case $B_1$ de-energization of the solenoid-operated change-over valve $h$, unloads the gear pump $m$ and thus prevents the transmission of any appreciable torque to the wheel-case connection shaft $p$ leading to the port wheel case $B_2$.

Since it is desirable for the port engine $E_2$ to be available in flight for re-starting the starboard engine $E_1$ if the latter has stopped or been stopped for any reason, the port wheel-case arrangement of FIG. 4 has been made symmetrical by the addition of a second non-return valve $v'$ a second solenoid-operated change-over valve $h'$ and a second preset relief valve $n'$ at the opposite side of the pump $m$.

Both arrangements of FIGS. 3 and 4 are shown to include oil coolers $o$ for the oil in the hydraulic circuit, although these may not be necessary in all cases.

It will be readily appreciated that the invention permits any one of a number of engines, each connected to the auxiliary power unit by a separate differential-gear drive system according to the present invention, to be started without drastic speed reduction of the auxiliary power unit, thus permitting a number of propulsion engines in an aircraft to be started successively while, for example, electric energy remains available from the auxiliary power unit.

What we claim is:

1. An auxiliary-power system for use in conjunction with a combustion engine to drive auxiliary equipment and to provide starting power for such engine, which comprises in combination: a prime mover, an output shaft for the drive of such auxiliary equipment; drive means opposed between said output shaft and the prime mover to drive said output shaft at a speed proportional to that of the prime mover; a starting-power output-shaft; a three-element differential gear drive two of the three elements of which are respectively coupled to the prime mover and to the starting power output shaft; a positive-displacement pump coupled to the third element of said differential gear drive and arranged to deliver liquid to a low-pressure point; a pressure-retaining valve operable to oppose a pressure to the flow of liquid from said pump to said low-pressure point; and loading means for said pressure-retaining valve operable to load the said valve with a force which is adjustable from substantially zero to a maximum so determined as to limit the torque load applied by said pump to the prime mover through said differential-gear drive to a value lower than the torque output available from the prime mover.

2. An auxiliary-power system as claimed in claim 1, which further includes a displacement-type motor drivingly coupled to said starting-power output shaft and connected to be fed by fluid delivered by said positive-displacement pump.

3. An auxiliary-power system as claimed in claim 1, which further comprises a second pressure-retaining valve, arranged in a line connecting the point of low pressure with the other side of the pump and operable by flow in the opposite direction so as to oppose a torque resistance to rotation of the third element of the differential-gear drive in the opposite direction when the starting-power output shaft tends to run faster than the speed at which it tends to be driven by the auxiliary power unit via the differential gear drive, and two back-flow-operated non-return valves respectively by-passing the two pressure-retaining valves to permit unrestricted flow past each pressure-retaining valve in the direction opposite to that operative to open the retaining valve, so that during the starting of an engine the by-pass valve of the last-mentioned pressure-retaining valve and during transmission of torque from the engine to the auxiliary-power unit the non-return valve by-passing the first-mentioned pressure-retaining valve is open.

4. A system as claimed in claim 1 for use in connection with a plurality of engines, which includes for each engine a separate starting-power output shaft, a separate three-element differential gear drive and, in conjunction with said differential gear drive, a separate positive-displacement pump and pressure-retaining valve.

* * * * *